US007812835B2

(12) United States Patent
Kwak

(10) Patent No.: US 7,812,835 B2
(45) Date of Patent: Oct. 12, 2010

(54) DISPLAY APPARATUS AND CONTROL METHOD THEREOF

(75) Inventor: Chang-kwun Kwak, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 641 days.

(21) Appl. No.: 11/845,132

(22) Filed: Aug. 27, 2007

(65) Prior Publication Data

US 2008/0117127 A1 May 22, 2008

(30) Foreign Application Priority Data

Nov. 16, 2006 (KR) ...................... 10-2006-0113346

(51) Int. Cl.
*G09G 5/00* (2006.01)
*G06F 3/038* (2006.01)

(52) U.S. Cl. ......................... 345/211; 345/1.1; 345/204

(58) Field of Classification Search .................. 345/1.1, 345/1.2, 156, 169, 87, 690, 204, 211, 212, 345/213
See application file for complete search history.

(56) References Cited

U.S. PATENT DOCUMENTS 5,844,552 A * 12/1998 Gaughan et al. .............. 725/37
6,061,719 A * 5/2000 Bendinelli et al. .......... 709/218
6,933,936 B1 * 8/2005 Hirai .......................... 345/211
2005/0085263 A1 * 4/2005 Kim et al. ................ 455/556.1
2006/0290690 A1 * 12/2006 Ahn ........................... 345/211
2007/0032272 A1 * 2/2007 Hsu et al. .................. 455/574

FOREIGN PATENT DOCUMENTS

KR 10-2002-0084940 A 11/2002
KR 10-2003-036992 A 5/2003
KR 10-2003-070171 A 8/2003

* cited by examiner

*Primary Examiner*—Duc Q Dinh
(74) *Attorney, Agent, or Firm*—Sughrue Mion, PLLC

(57) ABSTRACT

A display apparatus having a monitor functional mode and a network functional mode, includes a first voltage switching part that controls a first operation voltage; a second voltage switching part that controls a second operation voltage; a voltage drop converting part that generates and supplies a third operation voltage; and a controlling part that controls at least one of the first voltage switching part and the second voltage switching part depending on a functional mode, and controls the voltage drop converting part to maintain a work file related to the network functional mode if the monitor functional mode is selected.

19 Claims, 5 Drawing Sheets

DISPLAY APPARATUS AND CONTROL METHOD THEREOF

CROSS-REFERENCE TO RELATED APPLICATIONS

This application claims priority from Korean Patent Application No. 10-2006-0113346, filed on Nov. 16, 2006 in the Korean Intellectual Property Office, the disclosure of which is incorporated herein by reference.

BACKGROUND OF INVENTION

1. Field of Invention

Apparatuses and methods consistent with the present invention relate to a display apparatus and a control method thereof, and more particularly, to a display apparatus which is capable of minimizing power consumption according to a functional mode, and a control method thereof.

2. Description of the Related Art

In general, a display apparatus such as a liquid crystal display (LCD), a plasma display panel (PDP) and so on is used to display an image in a variety of fields including a television, a computer monitor, etc.

Typically, a display apparatus is connected to a computer via a D-Sub connector or a digital video interface (DVI) connector so that a video signal can be transmitted from the computer to the display apparatus. In addition to the D-Sub connector or the DVI connector, the display apparatus further includes a separate video (S-video) connector, a component connector or a composite connector to receive a video signal from an external video apparatus such as a digital versatile disk (DVD) player or a video cassette recorder (VCR).

On the other hand, display apparatuses which have network processors and can display multimedia data received via a network as images as well as displaying video signals received from computers as images have come into the market.

Such display apparatuses are designed to simultaneously switch on or off an operation voltage supplied to functional blocks irrespective of a functional mode if one of a monitor functional mode and a network functional mode is used. Accordingly, if a user uses a display apparatus only in the monitor functional mode, the operation voltage is also supplied to the network processor, which results in inefficiency due to increased power consumption. In addition, when the user changes from the network functional mode to the monitor functional mode, as the operation voltage supplied to the network processor is interrupted when the display apparatus operates in a monitor power save mode, an operating system of the display apparatus has to be rebooted. Thus, if the user created a file but did not store the created file before the operating system reboot, the file must be recreated.

SUMMARY OF THE INVENTION

Exemplary embodiments of the present invention overcome the disadvantages described above and other disadvantages not described above. Also, the present invention is not required to overcome the disadvantages described above, and an exemplary embodiment of the present invention may not overcome any of the problems described above.

Embodiments of the present invention provide a display apparatus with efficient power management, and a control method thereof.

An aspect of the present invention provides a display apparatus which is capable of maintaining a work file of a network functional mode in a monitor functional mode.

Additional aspects of the present invention will be set forth in part in the description which follows and, in part, will be obvious from the description, or may be learned by practice of the present invention.

Aspects of the present invention provide a display apparatus having a monitor functional mode and a network functional mode, comprising: a first voltage switching part that controls a first operation voltage; a second voltage switching part that controls a second operation voltage; a voltage drop converting part that generates and supplies a third operation voltage; and a controlling part that controls at least one of the first voltage switching part and the second voltage switching part depending on a functional mode, and controls the voltage drop converting part to maintain a work file related to the network functional mode when the monitor functional mode is selected.

The controlling part may control the voltage drop converting part to maintain the work file related to the network functional mode if the display apparatus enters a power save mode during operation of the monitor functional mode.

The display apparatus may further comprise a volatile memory, wherein the controlling part records an operating system program in the volatile memory when the second operation voltage is supplied.

The controlling part may control the voltage drop converting part to supply the third operation voltage to the volatile memory in order to maintain the recorded operating system program.

The display apparatus may further comprise a network module supplied with the third operation voltage output from the voltage drop converting part.

The voltage drop converting part may have one of the first operation voltage and the second operation voltage as an input voltage.

The controlling part may output an enable signal to the voltage drop converting part so that the voltage drop converting part can generate and output the third operation voltage.

The display apparatus may further comprise a video processing and displaying part and a data converting part, wherein, if the display apparatus operates in the monitor functional mode, the controlling part controls the first voltage switching part to supply the first operation voltage to the video processing and displaying part, and controls the second voltage switching part to interrupt the second operation voltage supplied to the data converting part.

The display apparatus may further comprise a red-green-blue (RGB) input part that receives a video signal, wherein, if the video signal is not detected from the RGB input part in the monitor functional mode, the controlling part controls the first voltage switching part to interrupt the first operation voltage supplied to the video processing and displaying part.

If the display apparatus operates in the network functional mode, the controlling part may control the first voltage switching part to supply the first operation voltage to the video processing and displaying part, and controls the second voltage switching part to supply the second operation voltage to the data converting part.

If the display apparatus enters the monitor functional mode during operation of the network functional mode, the controlling part may control the voltage drop converting part to supply the third operation voltage.

The voltage drop converting part may have the first operation voltage as an input voltage.

The foregoing and/or other aspects of the present invention can be achieved by providing a control method of a display apparatus comprising an RGB input part, a video processing and displaying part, a network module and a data converting part and having a monitor functional mode and a network functional mode, the control method comprising: booting an operating system if the network functional mode is input; converting data received through the network module into a video signal in the data converting part in order to indicate the network functional mode and processing and displaying the video signal in the video processing and displaying part; and if the network functional mode is changed to the monitor functional mode, processing and displaying a video signal inputted through the RGB input part in the video processing and displaying part, stopping the operation of the data converting part, and supplying an operation voltage to maintain the operation of the operating system.

The control method may further comprise: if the monitor functional mode is changed to a power save mode, stopping the operation of the video processing and displaying part and continuously supplying the operation voltage to maintain the operation of the operating system.

The display apparatus may comprise a volatile memory, and the supplying the operation voltage comprises supplying the operation voltage to at least one of the volatile memory and the network module.

The control method may further comprise: if input of the video signal through the RGB input part is not detected during operation of the monitor functional mode, stopping the operation of the video processing and displaying part.

The display apparatus may comprise a power button, further comprising: if the power button is turned off, storing one of the monitor functional mode and the network functional mode in operation.

The control method may further comprise: if the power button is turned on and the monitor functional mode is stored, operating the video processing and displaying part.

The control method may further comprise: if the power button is turned on and the network functional mode is stored, operating the video processing and displaying part and the data converting part.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS

Figure 1:
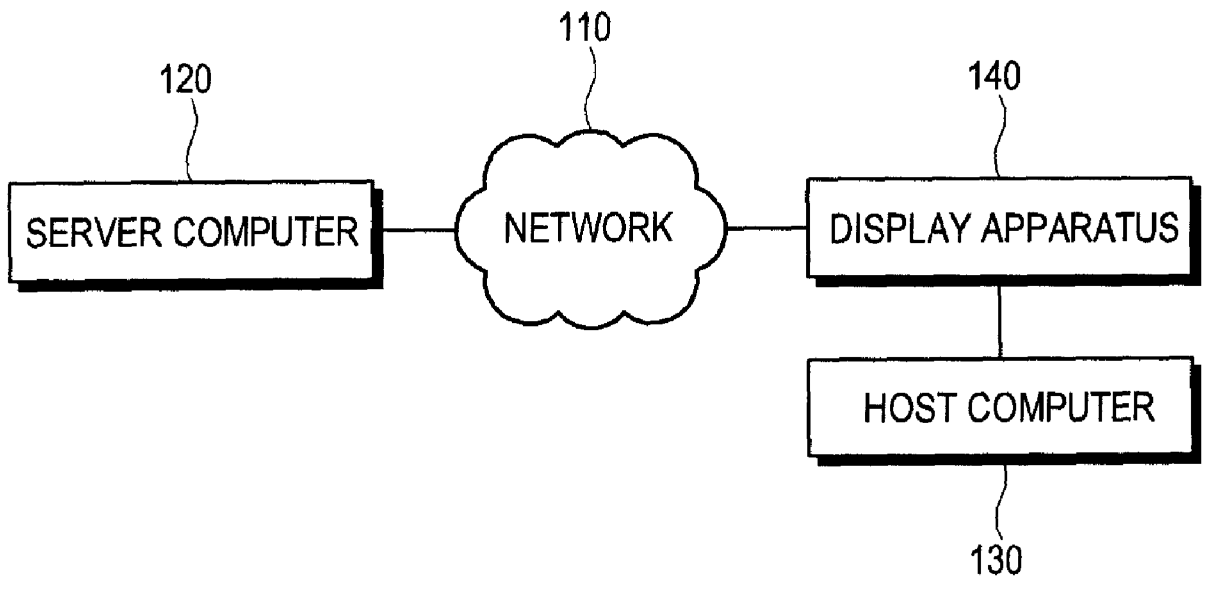
FIG. 1 illustrates a display system including a display apparatus according to an exemplary embodiment of the invention.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

Figure 2:
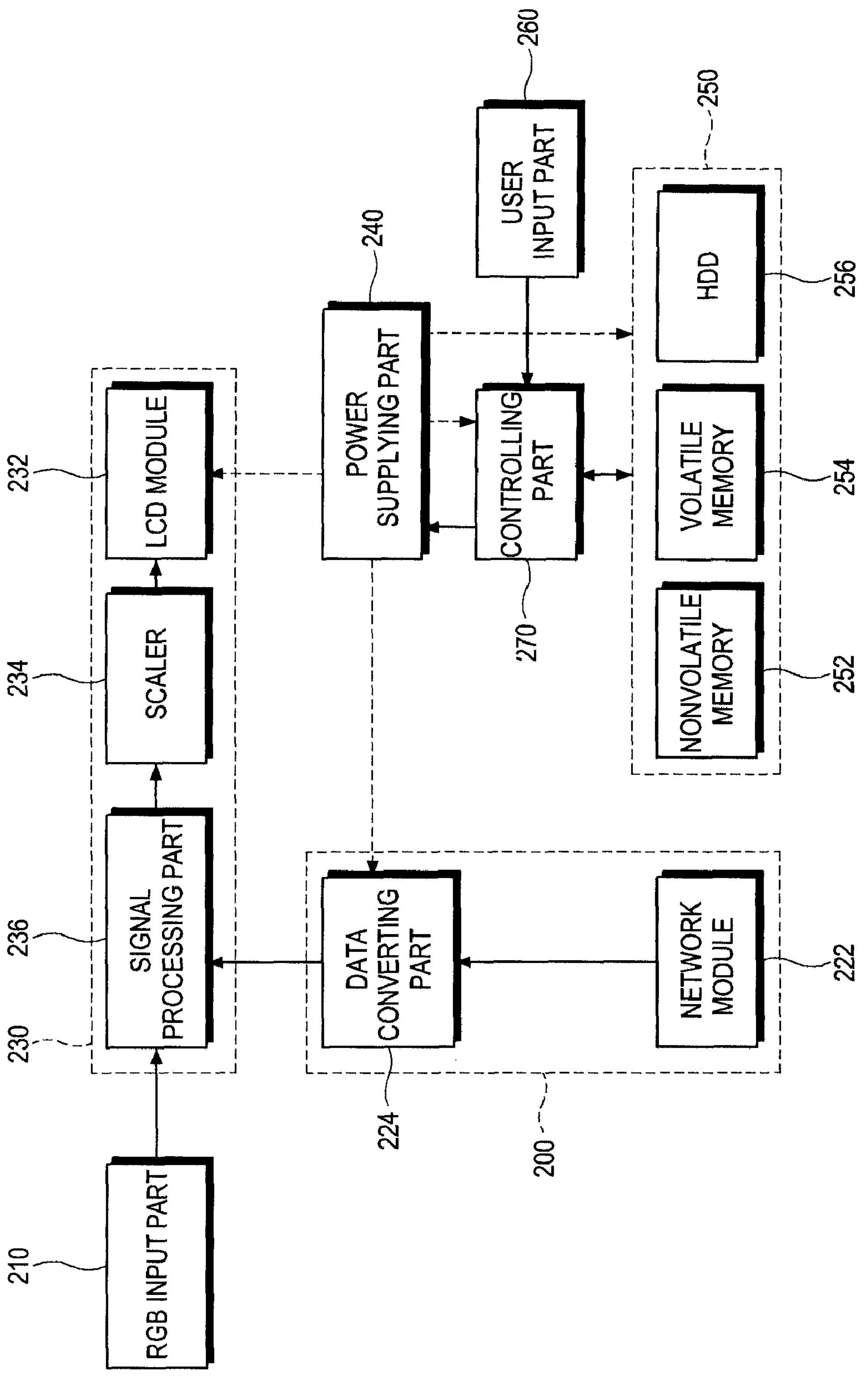
FIG. 2 is a schematic block diagram illustrating a configuration of the display apparatus according to an exemplary embodiment of the invention.

FIG. 1 is a view illustrating a display system including a display apparatus according to an exemplary embodiment of the invention, and FIG. 2 is a schematic block diagram illustrating a configuration of the display apparatus according to an exemplary embodiment of the invention.

As illustrated in FIGS. 1 and 2, a display apparatus 140 according to an exemplary embodiment of the invention is connected to a server computer 120 via a network 110 connected to a network module 222. The display apparatus 140 receives multimedia data transmitted from the server computer 120 and converts the received multimedia data into a signal displayed as an image. The server computer 120 and the display apparatus 140 may be interconnected by the network 110, for example, but not limited to, a local area network (LAN), and may exchange data therebetween using corresponding communication protocols.

In addition, as illustrated in FIGS. 1 and 2, the display apparatus 140 is connected to a host computer 130 through an RGB input part 210. In this case, the host computer 130 and the RGB input part 210 are interconnected via a D-Sub connector or a DVI connector for transmission of a video signal. The display apparatus 140 further comprises an S-video connector, a component connector or a composite connector.

The display apparatus also comprises the RGB input part 210, a network processing part 220, a video processing and displaying part 230, a power supplying part 240, a storing part 250, a user input part 260 and a controlling part 270.

The RGB input part 210 receives a video signal from the host computer 130 via the D-Sub connector or the DVI connector and transmits the received video signal to the video processing and displaying part 230.

The network processing part 220 comprises a network module 222 that receives multimedia data through the network 110 and a data converting part 224 that converts the multimedia data into a signal adapted to be displayed.

The network module 222 exchanges the multimedia data with the server computer 120 through the network 110 according to a specified communication protocol, for example, but not limited to, a Transmission Control Protocol/Internet Protocol (TCP/IP) communication protocol, and has its own internet protocol (IP) address. Accordingly, the server computer 120 transmits the multimedia data to an IP address of the display apparatus 140 connected through the network 110.

The data converting part 224 converts the multimedia data received through the network module 222 into a video signal which can be processed by the video processing and displaying part 230. That is, the data converting part 224 decodes compressed image data received by the network module 222 and converts the decoded image data into a video signal having a format which can be processed by the video processing and displaying part 230. In this case, the data converting part 224 can output an analog RGB signal or a digital RGB signal, and the analog RGB signal or the digital RGB signal is output to a signal processing part 236 or a scaler 234 of the video processing and displaying part 230.

The video processing and displaying part 230 comprises an LCD module on which an image is displayed, the scaler 234 that performs a scaling operation for adjusting an aspect ratio, and the signal processing part 236 that converts a video signal having various formats into a video signal having a format which can be processed by the scaler 234. The configuration of the video processing and displaying part 230 may be varied depending on a format of a video signal output from the RGB input part 210 and a format of a video signal output from the data converting part 224. For example, if the format of the video signal output from the data converting part 224 is of an analog RGB signal type, the signal processing part 236 may comprise an A/D converter that converts the analog RGB signal into a digital RGB signal and outputs the digital RGB signal to the scaler 234. If the format of the video signal input to the video processing and displaying part 230 is of a digital RGB signal type, since the digital RGB signal is directly input to the scaler 234, the signal processing part 236 may be excluded from the configuration of the video processing and displaying part 230.

Although FIG. 2 shows the LCD module 232 in connection with a display of the video processing and displaying part 230, it is to be understood that various types of display modules, for example, but not limited to, a digital light processing (DLP) device or a PDP, may be used as the display of the video processing and displaying part 230.

The power supplying part 240 supplies operation voltages to the network processing part 220, the video processing and displaying part 230 and the storing part 250 under control of the controlling part 270. Details of the power supplying part 240 will be described later.

The storing part 250 comprises a nonvolatile memory 252, a volatile memory 254 and a hard disk drive (HDD) 256. The nonvolatile memory 252 and the hard disk drive 256 may comprise an external storage such as a memory stick to be inserted into the display apparatus 140. Various control routines for creating and processing data and processing data received through the network module 222 may be stored in the nonvolatile memory 252 and the hard disk drive 256. For example, an operating system program of the displaying apparatus 140 and application programs for execution of various types of multimedia data received through the network module 222 may be stored in the nonvolatile memory 252 and the hard disk drive 256. The volatile memory 254 loads and records the operating system when the network processing part 220 operates and records a control routine, such as a program of the controlling part 270, and various data. The volatile memory 254 may comprise, for example, but not limited to, a synchronous dynamic random access memory (SDRAM) or a double data rate (DDR)-SDRAM.

The controlling part 270 outputs control signals of a controller (not shown) and a bridge (not shown). The controlling part 270 controls a booting process for loading the operating system stored in the nonvolatile memory 252 or the hard disk drive 256 onto the volatile memory 254. The controlling part 270 and the network module 222 may be interconnected via a data bus of a prescribed standard, for example, but not limited to, a Peripheral Component Interconnect (PCI) bus.

Figure 3:
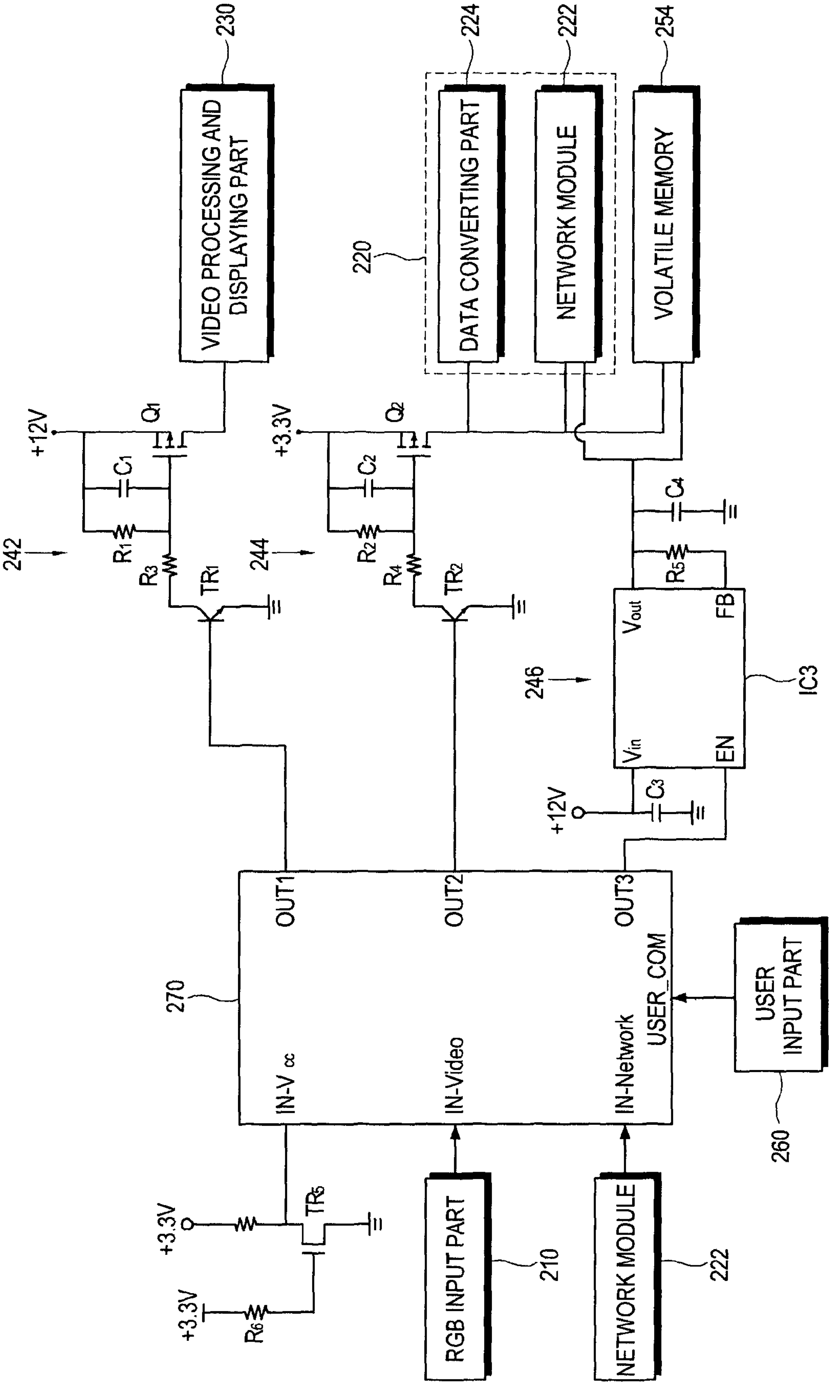
FIG. 3 illustrates a configuration of a power supplying part and a controlling part according to an exemplary embodiment of the invention.

FIG. 3 is a view illustrating a configuration of the power supplying part 240 and the controlling part 270 according to an exemplary embodiment of the invention.

As illustrated in FIG. 3, the power supplying part 240 comprises a first voltage switching part 242, a second voltage switching part 244 and a voltage drop converting part 246 in order to supply power to the video processing and displaying part 230, the network processing part 220 and the storing part 250.

The first voltage switching part 242 comprises a P-channel MOSFET Q1, a resistor R1, a capacitor C1, a resistor R2 and a transistor TR1 in order to control an operation voltage supplied to the video processing and displaying part 230.

The second voltage switching part 244 comprises a P-channel MOSFET Q2, a resistor R2, a capacitor C2, a resistor R4 and a transistor TR2 in order to control an operation voltage supplied to the network processing part 220.

The voltage drop converting part 246 comprises a voltage regulator IC3, a capacitor C3, a capacitor C4 and a resistor R5 in order to maintain a work file related to the network mode during operation of the monitor mode. The voltage regulator IC3 comprises an input voltage terminal Vin, an output voltage terminal Vout, an enable terminal EN and a voltage feedback terminal FB. Although it is shown in FIG. 3 that a voltage of +12V supplied to the first voltage switching part 242 is connected to an input voltage terminal Vin of the voltage regulator IC3, a voltage of +3.3V supplied to the second voltage switching part 244 may be connected to the input voltage terminal Vin.

The controlling part 270 comprises, as input terminals, an instruction receiving terminal USER_COM that receives an instruction input from the user input part 260, a network voltage detecting terminal IN_Vcc that detects a voltage supplied in connection with the network mode, a synchronization signal detecting terminal IN_Video that detects a synchronization signal contained in a video signal input through the RGB input part 210, and a network signal detecting terminal IN_Network that detects a data signal or a control signal input through the network module 222. In addition, the controlling part 270 comprises, as output terminals, a first output terminal OUT1 that controls the first voltage switching part 242, a second output terminal OUT2 that controls the second voltage switching part 244, and a third output terminal OUT3 that controls the voltage drop converting part 246.

Hereinafter, operation of the controlling part 270 and the power supplying part 240 as constructed above will be described in more detail.

When a user turns on a power button (not shown) provided in the user input part 260, the controller 270 checks a functional mode stored in the nonvolatile memory 252 such as a flash memory or the like. In this case, the stored functional mode is one of the monitor functional mode and the network functional mode which had operated when the power button was turned off.

If the monitor functional mode is stored, the controlling part 270 outputs a high level voltage to the first output terminal OUT1 in order to supply an operation voltage to the video processing and displaying part 230. Transistor TR1 is put into a conducting state by the high level voltage of the first output terminal OUT1 and a voltage lower than a drain voltage is applied to a gate of the P-channel MOSFET Q1 through the resistor R3, putting the P-channel MOSFET Q1 in a conducting state, thereby supplying a first operation voltage to the video processing and displaying part 230. When the first operation voltage is supplied to the video processing and displaying part 230, the video signal inputted through the RGB input part 210 is displayed on the LCD module 232 through the signal processing part 236 and the scaler 234. However, in case of the monitor functional mode, since the network processing part 220 requires no operation voltage, the controlling part 270 outputs a low level voltage to the second output terminal OUT2.

If the network functional mode is input during operation of the monitor functional mode, the operating system stored in the nonvolatile memory 252 or the hard disk drive 256 is stored in the volatile memory 254 and the display apparatus 140 is booted. In the network functional mode, an operation voltage is supplied to the network processing part 220 in addition to the video processing and displaying part 230. Accordingly, the controller 270 outputs a high level voltage to the second output terminal OUT2. The transistor TR2 is put into a conducting state by the high level voltage of the second output terminal OUT2 and a voltage lower than a drain voltage is applied to a gate of the P-channel MOSFET Q2 through the resistor R4, putting the P-channel MOSFET Q2 in a conducting state, thereby supplying a second operation voltage to the network processing part 220. Accordingly, the network module 222 receives and outputs the multimedia data input through the network 110 and the data converting part 224 decodes or converts the multimedia data into a video signal to be output to the signal processing part 236. The output video signal is displayed on the LCD module 232 through the signal processing part 236 and the scaler 234.

When the second operation voltage is supplied, since the second operation voltage of 3.3V is supplied to a gate of a transistor TR5 through a resistor R6, the transistor TR5 is put into a conducting state and a low level voltage is input to the network voltage detecting terminal IN_Vcc of the controlling part 270. Accordingly, the controlling part 270 recognizes that the network module 222 operates. FIG. 3 illustrates network module 222 operation is determined based on the detection of the second operation voltage, however, this determination may also be based on a signal indicating that booting of the operation system is completed.

If the monitor functional mode is input during operation of the network functional mode, the controlling part 270 outputs a high level voltage to enable an EN terminal of the voltage regulator IC3 to the third output terminal OUT3 in order to supply an operation voltage to maintain the operation of the operating system. The voltage regulator IC3 operates by the high level voltage and a third reduced operation voltage is output. In FIG. 3, a reduced operation voltage of 2.5V is output from the voltage drop converting part 246. Accordingly, power consumption can be reduced even while the operation voltage is supplied to the volatile memory 254 or the network module 222.

Figure 4:
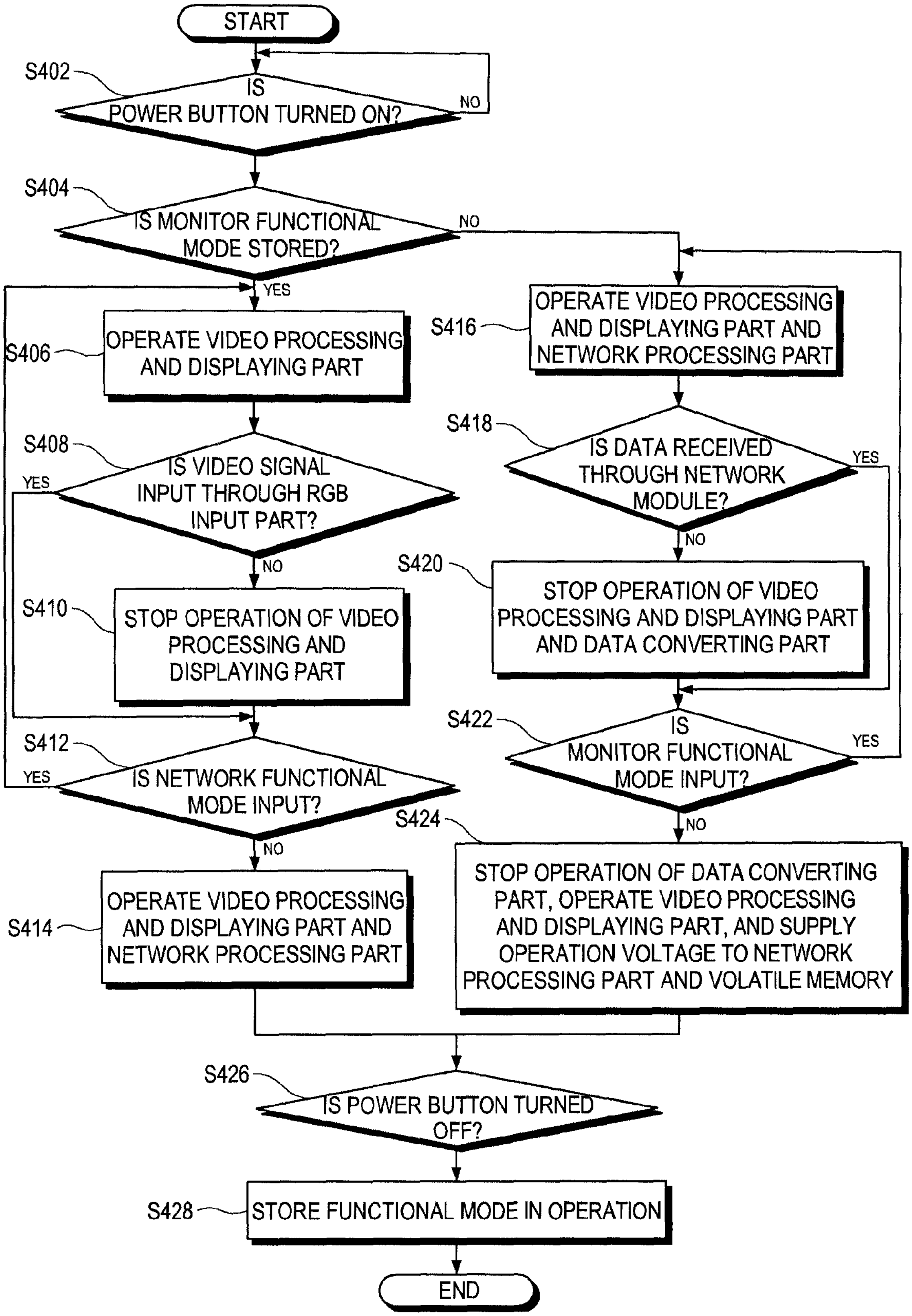
FIG. 4 is a flow chart illustrating a control method of the display apparatus according to an exemplary embodiment of the invention.
Figure 5:
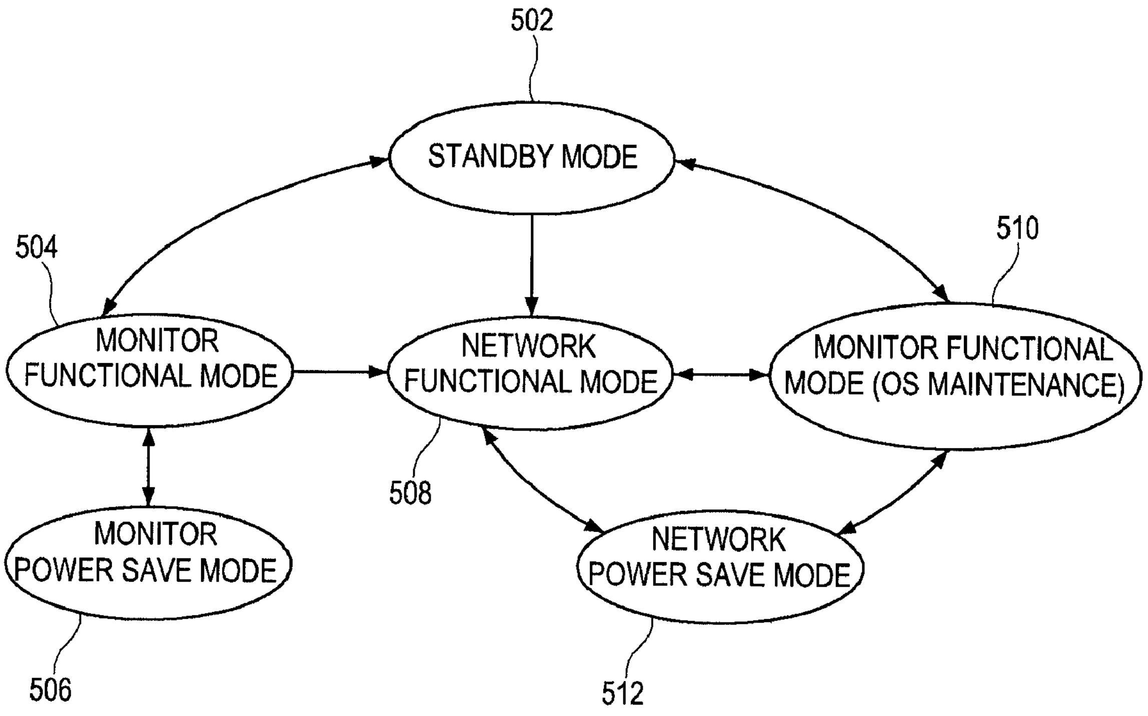
FIG. 5 illustrates an example of a plurality of management modes according to an exemplary embodiment of the invention.

FIG. 4 is a flow chart illustrating a control method of the display apparatus according to an exemplary embodiment of the invention, and FIG. 5 is a view illustrating an example of a plurality of management modes according to an exemplary embodiment of the invention.

When a power supply voltage is supplied to the display apparatus 140, the display apparatus 140 remains in a standby mode 502. The controlling part 270 checks whether a user turns on the power button of the user input part 260 at operation S402. If the power button is turned on, the controlling part 270 confirms whether the functional mode stored in the storing part 250 is the monitor functional mode 504 at operation S404. If it is confirmed that the functional mode is the monitor functional mode 504, the controlling part 270 enters the monitor functional mode 504. Accordingly, the controlling part 270 controls the first voltage switching part 242 to supply the first operation voltage to the video processing and displaying part 230. When the first operation voltage is supplied, the video processing and displaying part 230 processes a video signal input through the RGB input part 210 and displays a video on the LCD module 232 at operation S406.

If the host computer 130 is turned off or a video signal is not input through the RGB input part 210 since a D-Sub connector or the like is not connected to the host computer 130 at operation S408, the controlling part 270 controls entry into a monitor power save mode 506. Accordingly, the controlling part 270 controls the first voltage switching part to interrupt the first operation voltage supplied to the video processing and displaying part 230, thereby stopping the operation of the video processing and displaying part 230. If a video signal is input through the RGB input part 210 or an instruction is input through the user input part 260, the controlling part 270 controls entry into the monitor functional mode.

When the network functional mode 508 is input through the user input part 260 at operation S412, the controlling part 270 controls entry into the network functional mode 508. Accordingly, the controlling part 270 controls the first voltage switching part 242 to supply the first operation voltage to the video processing and displaying part 230 and controls the second voltage switching part 244 to supply the second operation voltage to the network processing part 220. When the first and second operation voltages are supplied to the video processing and displaying part 230 and the network processing part 220, respectively, the network module 222 of the network processing part 220 receives multimedia data, the multimedia data is converted into a video signal by the data converting part 224, and the video processing and displaying part 230 processes and displays the video signal at operation S414.

If the network functional mode 508 is stored in the storing part 250 at the operation S404, the controlling part 270 controls entry into the network functional mode 508. Accordingly, the controlling part 270 controls the first voltage switching part 242 to supply the first operation voltage to the video processing and displaying part 230 and controls the second voltage switching part 244 to supply the second operation voltage to the network processing part 220. When the first and second operation voltages are supplied to the video processing and displaying part 230 and the network processing part 220, respectively, the network module 222 of the network processing part 220 receives multimedia data, the multimedia data is converted into a video signal by the data converting part 224, and the video processing and displaying part 230 processes and displays the video signal at operation S416.

If multimedia data is not received for a specified period of time through the network module 222 at operation S418, the controlling part 270 controls entry into the network power save mode 512. Accordingly, the controlling part 270 controls the first voltage switching part 242 to interrupt the first operation voltage supplied to the video processing and displaying part 230, controls the second voltage switching part 244 to interrupt the second operation voltage supplied to the network processing part 220, and controls the voltage drop converting part 246 to maintain the operation of the network module 222 and the operation of the operating system stored in the volatile memory 254 at the minimum at operation S420. Accordingly, operation of the video processing and displaying part 230 and data converting part 224 is stopped. If multimedia data is received through the network module 222 or an instruction is input through the user input part 260, the controlling part 270 controls entry into the network functional mode 508.

If a monitor functional mode 510 is input through the user input part 260 at operation S422, the controlling part 270 controls entry into the monitor functional mode 510. Accordingly, the controlling part 270 controls the first voltage switching part 242 to supply the first operation voltage to the video processing and displaying part 230 and controls the second voltage switching part 244 to interrupt the second operation voltage supplied to the network processing part 220. In addition, the controlling part 270 controls the voltage drop converting part 246 to maintain the operation of the network module 222 and the operation of the operating system stored in the volatile memory 254 at the minimum at operation S424.

If the power button of the user input part 260 is turned off at operation S426, the controlling part 270 stores one of the monitor functional modes 504 and 510 and the network functional mode 508 in operation in the storing part 270 at operation S428.

As apparent from the above description, the present invention provides a display apparatus which is capable of efficiently managing power depending on a functional mode of the display apparatus, thereby reducing unnecessary power consumption.

In addition, the present invention provides a display apparatus which is capable of maintaining a work file of a network functional mode in a monitor functional mode, thereby safely protecting the work file and eliminating a need of rebooting.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus having a monitor functional mode and a network functional mode, the display apparatus comprising:

a first voltage switching part that controls a first operation voltage;

a second voltage switching part that controls a second operation voltage;

a voltage drop converting part that generates and supplies a third operation voltage; and a controlling part that controls at least one of the first voltage switching part and the second voltage switching part based on a functional mode, and controls the voltage drop converting part to maintain a work file related to the network functional mode if the monitor functional mode is selected.

2. The display apparatus according to claim 1, wherein the controlling part controls the voltage drop converting part to maintain the work file related to the network functional mode if the display apparatus enters a power save mode during operation of the monitor functional mode.

3. The display apparatus according to claim 1, further comprising a volatile memory, wherein the controlling part records an operating system program in the volatile memory if the second operation voltage is supplied.

4. The display apparatus according to claim 3, wherein the controlling part controls the voltage drop converting part to supply the third operation voltage to the volatile memory to maintain the recorded operating system program.

5. The display apparatus according to claim 4, further comprising a network module supplied with the third operation voltage output from the voltage drop converting part.

6. The display apparatus according to claim 4, wherein the voltage drop converting part has one of the first operation voltage and the second operation voltage as an input voltage.

7. The display apparatus according to claim 6, wherein the controlling part outputs an enable signal to the voltage drop converting part so that the voltage drop converting part generates and outputs the third operation voltage.

8. The display apparatus according to claim 1, further comprising a video processing and displaying part and a data converting part, wherein, if the display apparatus operates in the monitor functional mode, the controlling part controls the first voltage switching part to supply the first operation voltage to the video processing and displaying part, and controls the second voltage switching part to interrupt the second operation voltage supplied to the data converting part.

9. The display apparatus according to claim 8, further comprising an RGB input part that receives a video signal, wherein, if the video signal is not detected from the RGB input part in the monitor functional mode, the controlling part controls the first voltage switching part to interrupt the first operation voltage supplied to the video processing and displaying part.

10. The display apparatus according to claim 8, wherein, if the display apparatus operates in the network functional mode, the controlling part controls the first voltage switching part to supply the first operation voltage to the video processing and displaying part, and controls the second voltage switching part to supply the second operation voltage to the data converting part.

11. The display apparatus according to claim 10, wherein, if the display apparatus enters the monitor functional mode during operation of the network functional mode, the controlling part controls the voltage drop converting part to supply the third operation voltage.

12. The display apparatus according to claim 11, wherein the voltage drop converting part has the first operation voltage as an input voltage.

13. A control method of a display apparatus comprising an RGB input part, a video processing and displaying part, a network module and a data converting part and having a monitor functional mode and a network functional mode, the control method comprising:

booting an operating system if the network functional mode is input;

converting data received through the network module into a video signal in the data converting part in order to indicate the network functional mode and processing and displaying the video signal in the video processing and displaying part; and if the network functional mode is changed to the monitor functional mode, processing and displaying a video signal inputted through the RGB input part in the video processing and displaying part, stopping the operation of the data converting part, and supplying an operation voltage to maintain the operation of the operating system.

14. The control method according to claim 13, further comprising: if the monitor functional mode is changed to a power save mode, stopping the operation of the video processing and displaying part and continuously supplying the operation voltage to maintain the operation of the operating system.

15. The control method according to claim 13, wherein the display apparatus comprises a volatile memory, and wherein the supplying the operation voltage comprises supplying the operation voltage to at least one of the volatile memory and the network module.

16. The control method according to claim 13, further comprising: if input of the video signal through the RGB input part is not detected during operation of the monitor functional mode, stopping the operation of the video processing and displaying part.

17. The control method according to claim 16, wherein the display apparatus comprises a power button, the control method further comprising: if the power button is turned off, storing one of the monitor functional mode and the network functional mode in operation.

18. The control method according to claim 17, further comprising: if the power button is turned on and the monitor functional mode is stored, operating the video processing and displaying part.

19. The control method according to claim 17, further comprising: if the power button is turned on and the network functional mode is stored, operating the video processing and displaying part and the data converting part.

* * * * *